(No Model.) 7 Sheets—Sheet 1.
G. F. CARD.
ELECTRO DYNAMIC MACHINE.
No. 408,910. Patented Aug. 13, 1889.
*Fig. I.*
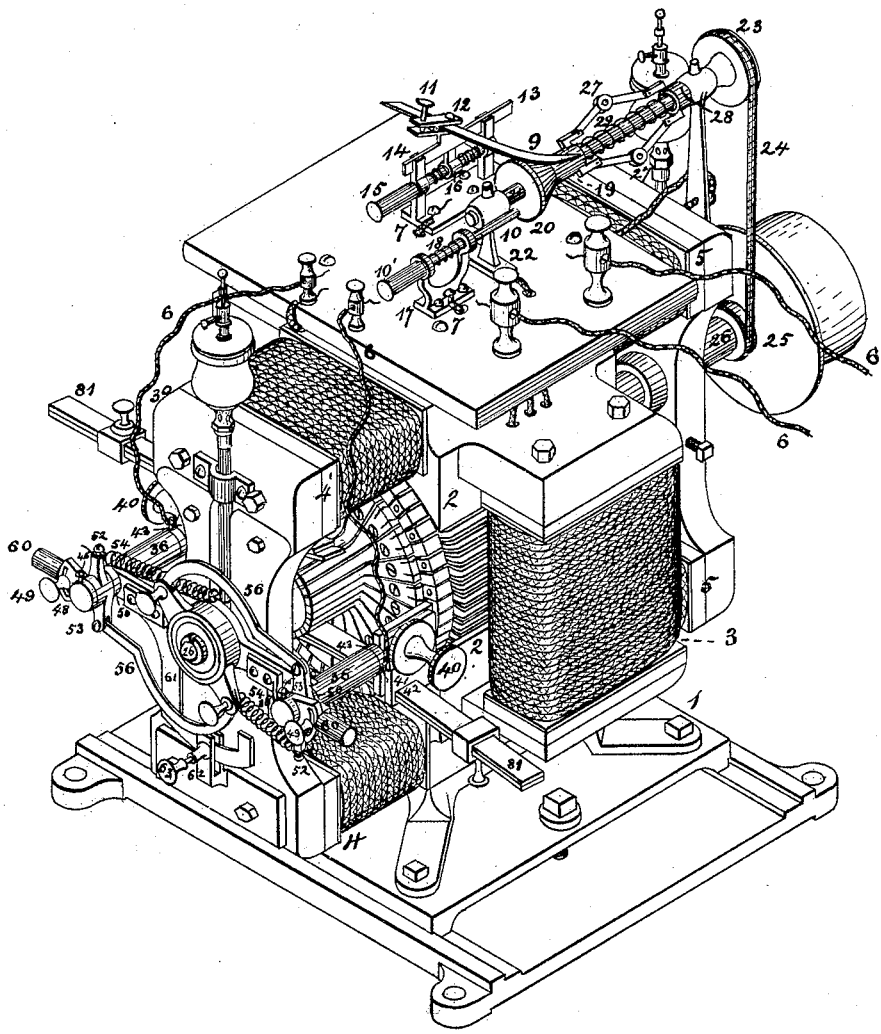
*Fig. V.*
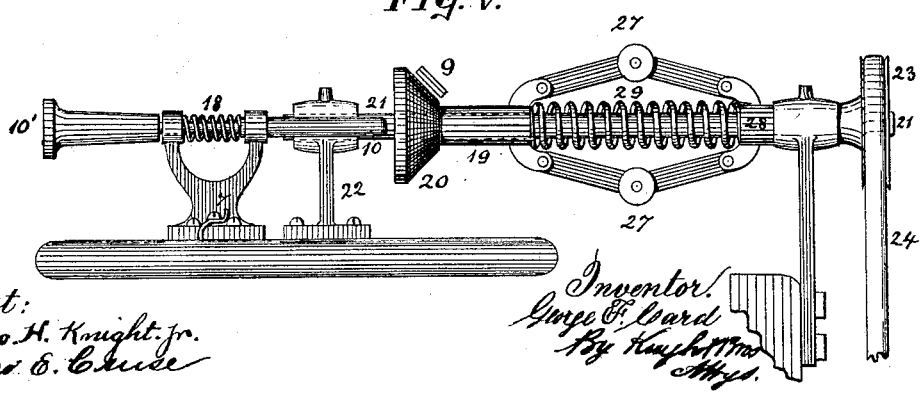
Attest:
Geo. H. Knight, Jr.
Geo. E. Cruse
Inventor:
George F. Card
By Knight Bros.
Attys.

(No Model.) 7 Sheets—Sheet 2.
G. F. CARD.
ELECTRO DYNAMIC MACHINE.
No. 408,910. Patented Aug. 13, 1889.
Fig. II.
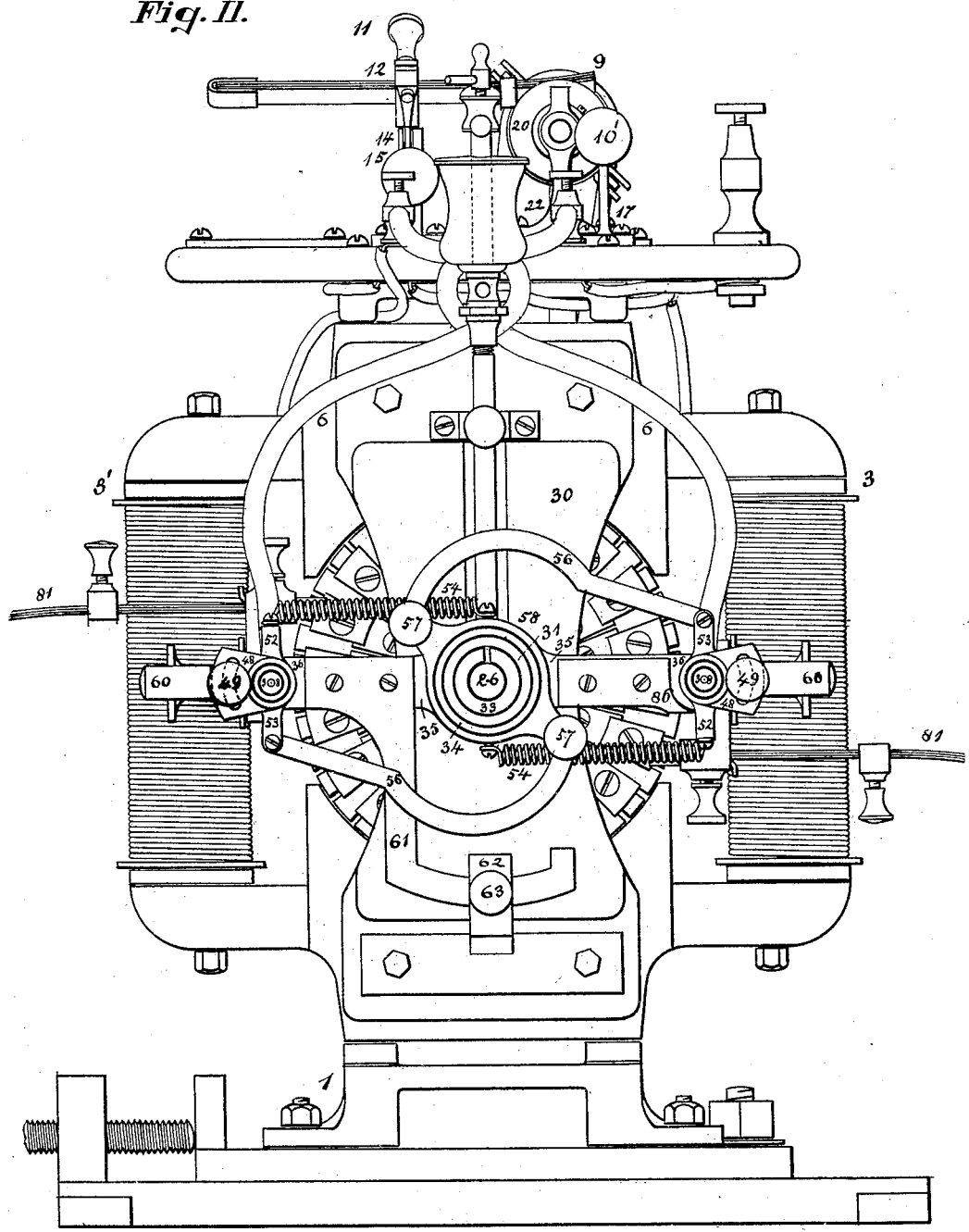
Fig. VIII.
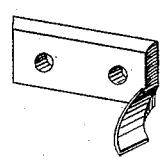
Attest:
Geo. H. Knight, Jr.
George E. Cruse
Inventor:
George F. Card
By Knight Bros.
Attys.

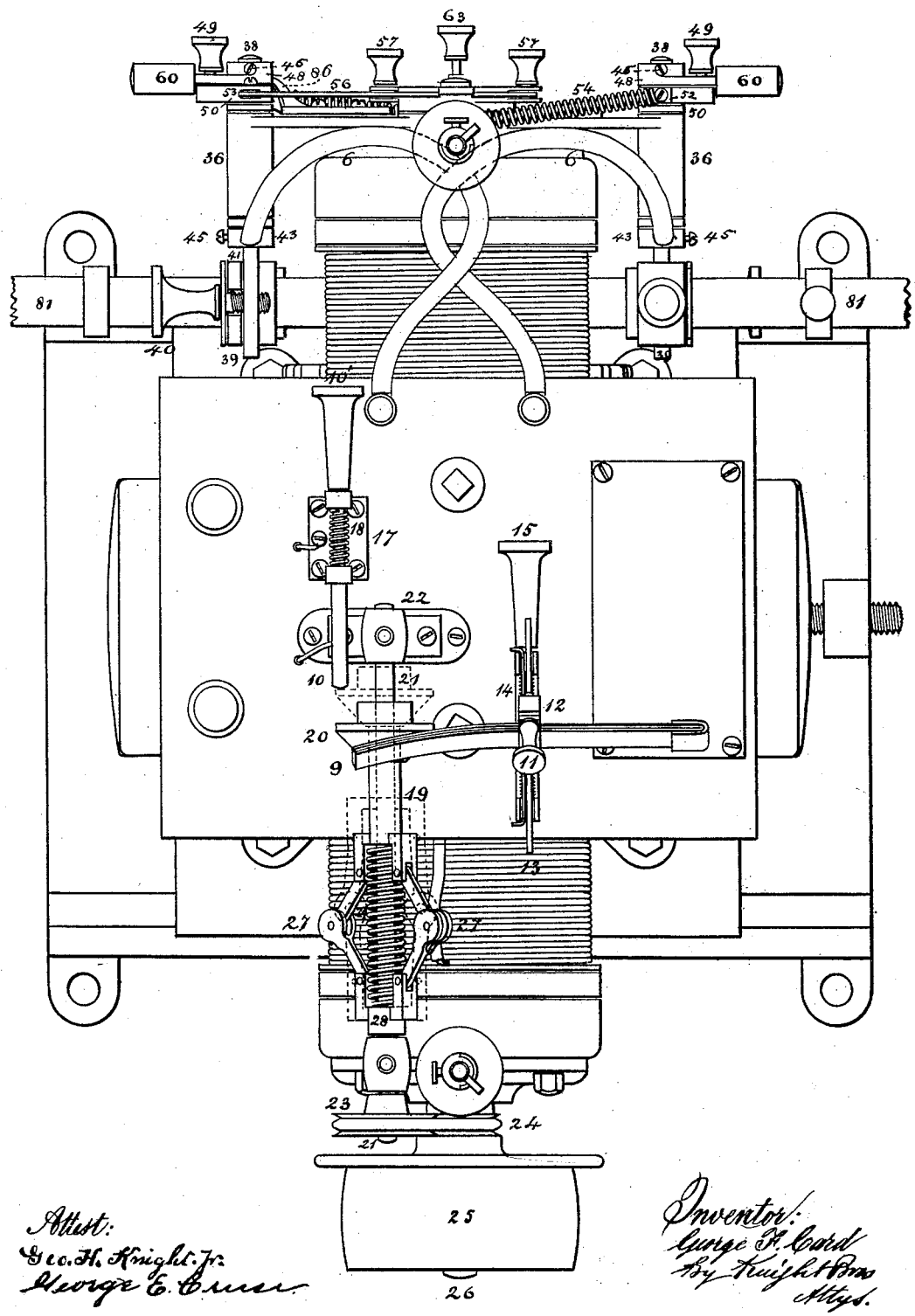

(No Model.)  7 Sheets—Sheet 4.
G. F. CARD.
ELECTRO DYNAMIC MACHINE.
No. 408,910. Patented Aug. 13, 1889.
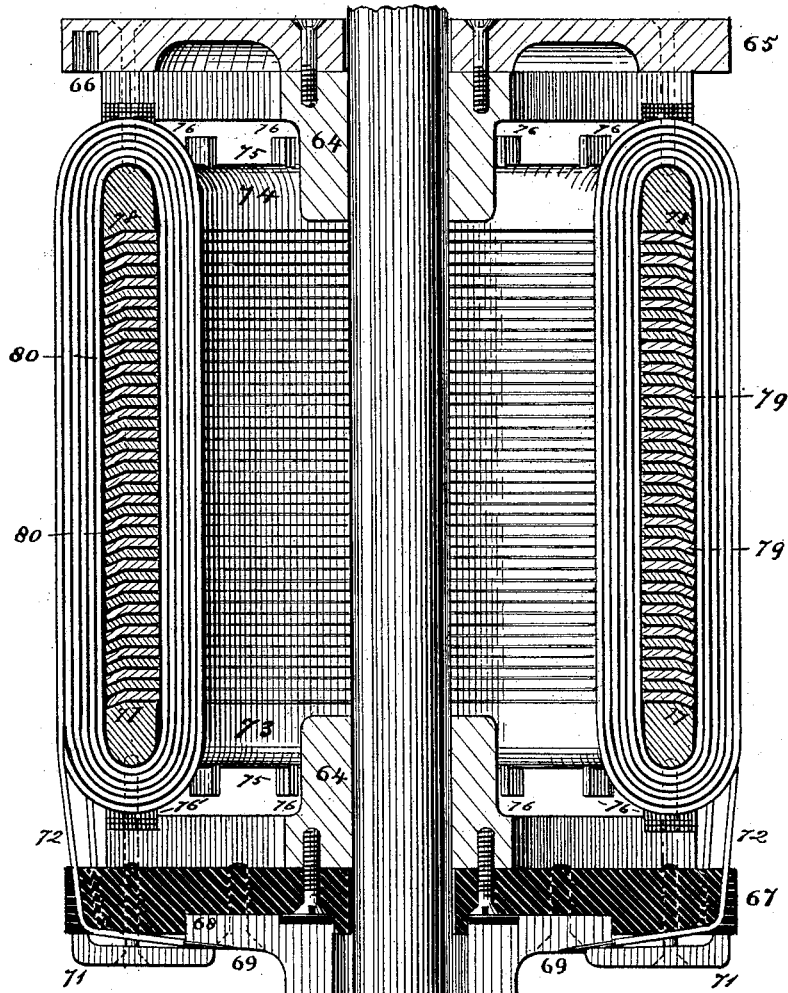
Fig. IV.
Attest:
Geo. H. Knight Jr.
Geo. E. Cross
Inventor:
George F. Card
By Knight Bros
Attys.

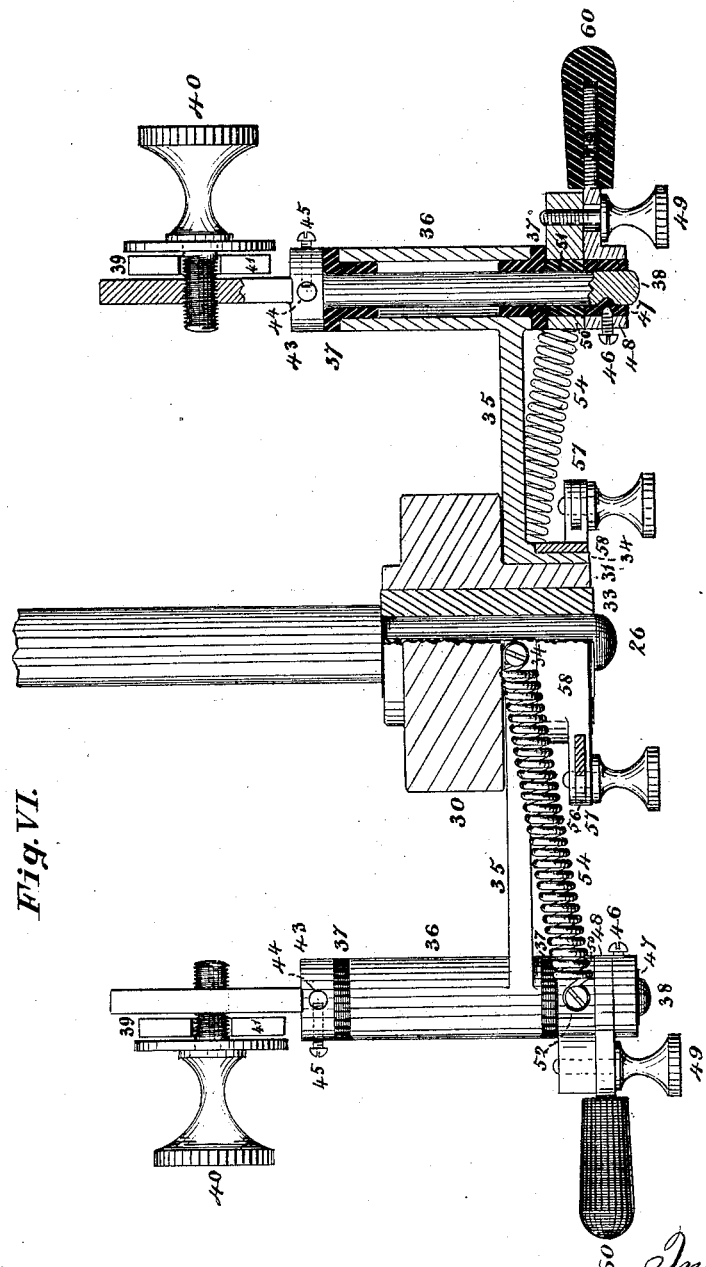

(No Model.) 7 Sheets—Sheet 6.
G. F. CARD.
ELECTRO DYNAMIC MACHINE.
No. 408,910. Patented Aug. 13, 1889.
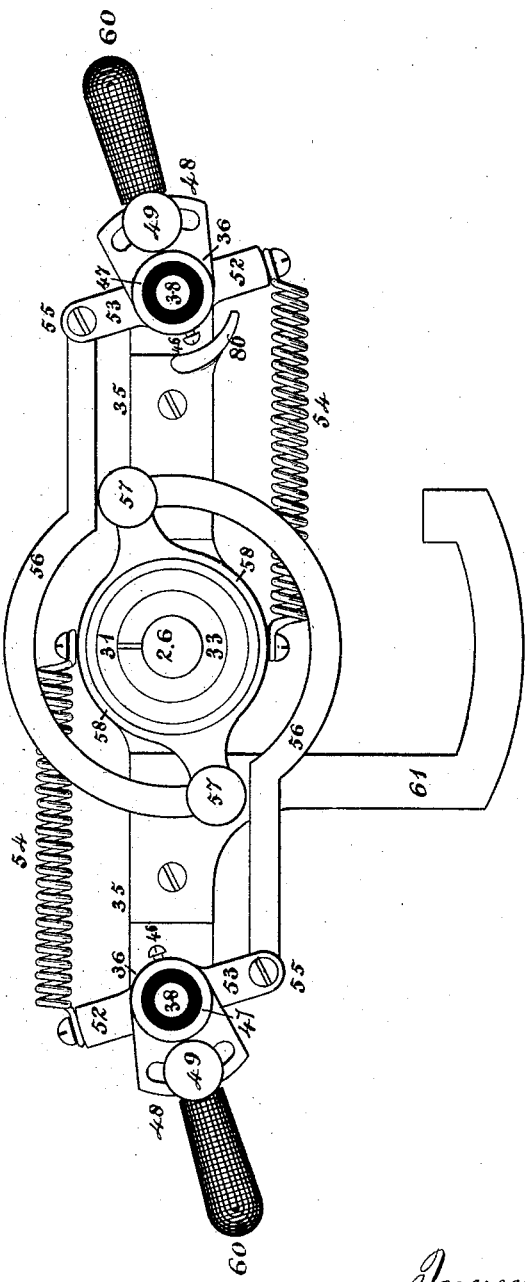
Fig. VII.
Attest:
Geo. H. Knight, Jr.
George E. Cruse
Inventor:
George F. Card
By Knight Bros.
Attys.

(No Model.)  7 Sheets—Sheet 7.
G. F. CARD.
ELECTRO DYNAMIC MACHINE.
No. 408,910. Patented Aug. 13, 1889.
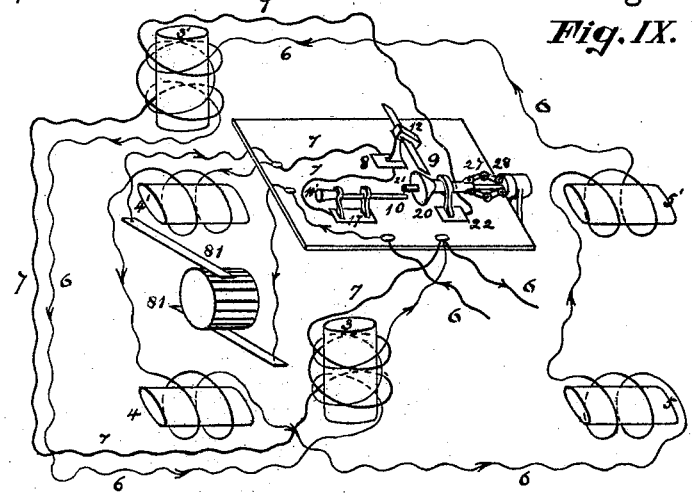
Fig. IX.
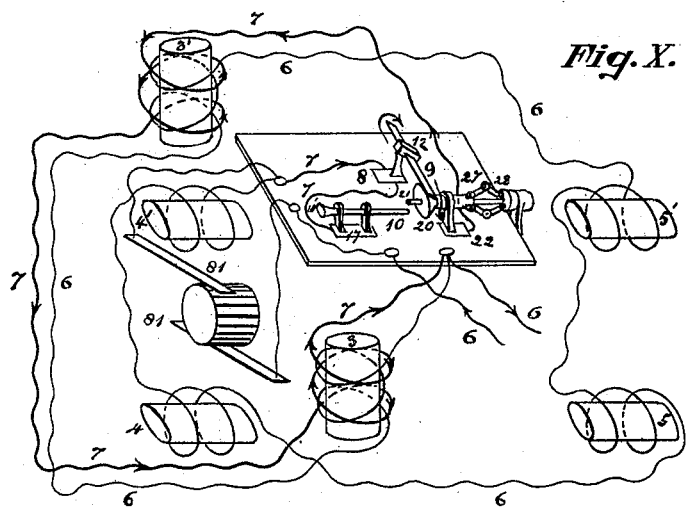
Fig. X.
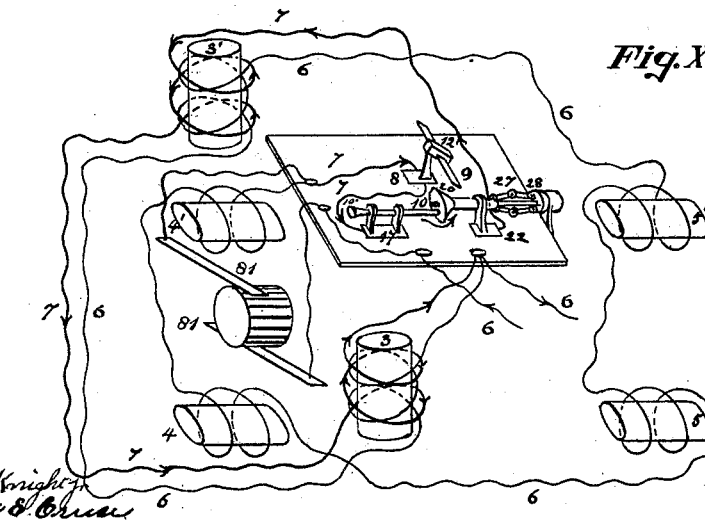
Fig. XI.

UNITED STATES PATENT OFFICE.

GEORGE F. CARD, OF COVINGTON, KENTUCKY, ASSIGNOR TO THE GEORGE F. CARD MANUFACTURING COMPANY, OF SAME PLACE.

ELECTRO-DYNAMIC MACHINE.

SPECIFICATION forming part of Letters Patent No. 408,910, dated August 13, 1889.

Application filed July 31, 1888. Serial No. 281,600. (No model.)

*To all whom it may concern:*

Be it known that I, GEORGE F. CARD, of Covington, Kenton county, Kentucky, have invented new and useful Improvements in Electro-Dynamic Machines, of which the following is a specification.

My improvements, while applicable to dynamo-electric devices generally, have been more particularly designed for and are here shown and described as applied to electro-dynamic machines or motors.

The first part of my invention relates to a governor whose construction is such as to automatically maintain a sensibly-uniform speed of armature rotation under changing loads, current forces, &c., and whose construction is, further, such as to promptly bring the armature to rest, either upon its rotation dropping below a given range of velocities or upon a disablement of the centrifugal regulator.

The second part of my invention relates to an improved construction for a laminated armature-core.

In the accompanying drawings, Figures I, II, and III are respectively a general perspective view, a front elevation, and a top view of an electric motor or engine embodying my improvements. Fig. IV is an axial section of my improved armature-core equipped with two of its bobbins. Fig. V is a side elevation of the governor as it appears within normal range of speeds. Fig. VI is a partly-sectioned top view of the brush-holder. Fig. VII represents by a front view that condition of my brush-holder in which both sets of brushes have been simultaneously lifted from the commutator. Fig. VIII represents a stop which limits forward vibration of the brush-holder. Figs. IX, X, and XI are diagrams to indicate the paths, respectively, taken by the current under three diverse conditions—to wit, Fig. IX for speeds within the prescribed limits, Fig. X for automatic correction of excessive speed, and Fig. XI for prompt arrest of motion either at approach of cessation of armature rotation or upon disablement of the centrifugal regulator.

Supported upon any suitable base 1 is a field-magnet 2, having one or more pairs of cores 3 3', 4 4', 5 5', upon which is wound the wire 6 of a normally-closed circuit which conveys the driving-current. Besides the said direct winding, one pair of field-cores—say 3 3'—is wound in the reverse direction with a comparatively low-resistance wire 7, which forms a normally-open loop and shunts or short-circuits said direct winding. This wire 7 is known in this specification as the "differential circuit" or "loop." In the normal running condition of the machine said differential circuit is currentless, and consequently inert, but is capable of being automatically energized either by a speed of the armature in excess of the maximum velocity assigned to it or by the opposite action of slowing down toward a stop, or, finally, by a disorganization of the centrifugal mechanism of the governor itself. Whenever from either cause named said differential circuit becomes the path of a current, its reversely-directed windings tend to neutralize and, if maintained long enough, to even overpower the magnetism of the direct windings. The means employed by me for bringing said differential circuit automatically into action in the presence of either condition mentioned are as follows:

One rheophore—say the positive one—of the differential circuit bifurcates from point 8 to two normally-stationary terminals or contact-pieces 9 10. The contact-piece 9 consists, preferably, of a bundle of copper strips, such as commonly known among electricians as a "brush," and is held by a binding-screw 11 in a clamp 12, that projects from a bar 13, which is capable of being adjusted forward or backward in a bracket 14 in electrical communication with the differential wire. This adjustment is accomplished by left or right rotation of a thumb-screw 15, which occupies a nut 16, that projects from the bar or slide 13. Adjustment of contact-piece 9, such as to cause it to approach the contact-piece 10, operates to reduce the maximum velocity, or that at which the machine is automatially limited by the governor. Adjustment in the opposite direction of course increases the maximum and permits a wider scope or range of velocities before automatic correction intervenes. The contact-piece 10 is supported by and is capable of sliding within a bracket 17 in electrical communication with the differential wire, and is maintained by a spring 18 in the normally-protracted condition shown. Its office is to cause automatic arrest of armature rotation either upon an approaching cessation of current force or upon a disablement of the centrifugal regulator. It can also, by manipulation of its handle 10', be utilized to start the machine, as hereinafter explained. Closure of the differential circuit is automatically accomplished by impact of the vibrating terminal 20 of said differential circuit's negative rheophore with either contact-piece 9 or 10. The said terminal 20 has preferably the represented conical form, and with its hub 19 rotates with, but is capable of sliding upon, a shaft 21, whose supporting-bracket 22 has electrical communication with the differential wire. Said shaft 21 carries a pulley 23, which is driven from the armature-shaft 26 by means of belt-and-pulley connection 24 25.

27 is a centrifugal regulator hinged at one end to a collar 28 of said shaft 21 and at its other end to said hub 19 of the vibrating terminal 20. Opposed to the centrifugal action of the regulator is a spring 29, whose tendency is to bring the regulator to the collapsed condition seen in Fig. XI. Rotation operates, of course, to spread the regulator-arms and tends to bring the cone 20 in impact with the speed-rectifying contact-piece 9. This condition of the parts is seen in Figs. I, III, and IX. The effect of such impact is to reduce the armature rotation within the prescribed limits by the lowering of the field-magnetism which ensues from the counteracting influence of the combined short-circuiting and neutralizing actions of the thus momentarily-energized differential coil. The instant that a proper reduction of speed has been reached the slowing of the armature reacts to reduce the centrifugal action, permits the spring 29 to partially collapse the regulator, releases the vibrating terminal 20 from the contact-piece 9, and by thus re-opening the differential circuit causes the machine to resume its normal conditions.

In practice with a full dynamo-current the hand adjustment of the contact-piece 9 should be such as to just barely secure impact with the vibrating terminal 20 at the extreme maximum, and, this being done, so delicate and prompt is the movement that the differential action is obtained by very minute changes of contact-pressure of said terminals rather than by their complete separation and reimpact.

It will be seen that any desired sensitiveness of governor action may be secured by approximation of contact-piece 9 to contact-piece 10, because a smaller increment of speed is then required to effect impact, and by so doing bring the differential action into play, and that, conversely, an adjustment which widens the distance between said contact-pieces permits a greater range of changing velocities and a higher speed maximum before the automatic readjustment can take place.

Should the armature slow down so much as to almost come to rest, with of course consequent complete collapse of the centrifugal regulator, the differential circuit becomes again, and now more protractedly, energized in consequence of impact of the base of the cone 20 with the contact-piece 10. (See Fig. XI.) The consequent suppression and momentary reversal of field magnetism overcomes both the molar and the magnetic inertias of the armature and brings it promptly to rest.

Should the governor become inoperative from any accident—such, for example, as the slipping of the belt 24—the machine is prevented from "running wild," because the collapse of the regulator completes the differential circuit by again bringing the terminals 10 and 20 in contact and stops the machine, thus warning the attendant and enabling him to ascertain and remedy the defect before setting the machine again in motion. The contact-piece 10, being held to its normal position by spring 18, yields easily to the pressure of without losing contact with the vibrating terminal 20, and by such retention of contact insures sufficient duration of differential action to bring and hold the armature to rest without necessitating a cutting out of the dynamo-circuit. The machine is consequently in condition to be started at will by a momentary retraction of the handle 10'.

My holder for the pair of commutator-brushes is preferably constructed as follows: One of the frame-castings 30 has a boss 31, which contains the front journal-box 33 of the armature-shaft 26, and is concentric therewith, and consequently with the commutator. Fitted snugly around the boss 31 is a hub 34, which, with arms 35 and boxes 36, constitutes the circularly-adjustable support for the brushes and enables the attendant to set them at the desired plane of commutation. The brush-holder is retained upon the top 31 and held to the selected plane of commutation by means of a tongue 61, which, extending downward from said support, occupies a clamp 62, and is held to its adjustment by binding-screw 63.

The following description of the special holding devices for one brush applies equally to both.

Each box 36 has insulating-bushings 37 for cylindrical shank 38 of a clamp 39, which has a pinching-screw 40. In said clamp is fastened a plate 41, having a slot 42, that holds the copper strips 81 which constitute the brush. A slackening of the screw 40 permits expeditious removal of such plate with its contained brush without disturbing the other parts of the machine. A collar 43 of said shank has an orifice 44 and a binding-screw 45 for the wire 6 of the main circuit. Rigidly attached to shank 38 by set-screw 46, but insulated therefrom by bushing 47, is a slotted sector 48, whose binding-screw 49 enables it to be set and held at any desired angle relatively to a thimble 50, which is concentric with and capable of rotating about said shank 38, from which it is insulated by means of bushing 51. The thimble 50 has extending from opposite sides of it arms 52 53, of which one arm 52 is connected by helical spring 54 with the hub 34 of the supporting-piece. To the opposite arm 53 is hinged, as at 55, a curved bar 56, whose other end is hinged, as at 57, to a hoop 58, which loosely encircles the hub 34. Extending outward from the slotted sector 48 is a tang 59, for attachment of a handle 60, of vulcanite or other suitable non-conductor, to enable safe and easy manipulation of the brush-holder either for adjustment of the plane of commutation or of either brush about its own shank as an axis. It is possible by this means to swing either brush wholly free of the commutator or to adjust the two brushes to any desired mutual pressure thereupon; or by forcible shift to the position shown in Fig. VII the same connections are utilized to place and hold both brushes aloof from the commutator.

A stop or detent 86 prevents excessive pressure of the brushes against the commutator.

The armature preferably employed by me belongs to the so-called "Pacinotti" type, whose core consists of an iron cylinder carrying a series of bobbins all wound in the same direction, such cylinder being composed of numerous laminations parallel with the plane of rotation, in order that the magnetic lines of force may be restricted to such parallel.

My said armature-cylinder and its attached commutator are preferably constructed as follows:

73 74 are two iron rings from whose rounded outer edges 75 extend equidistant lugs 76, that serve to separate the armature-bobbins, and of which some have threaded holes for the screws which enable their attachment to the non-magnetic spiders 64, by which they are made fast to the shaft 26. One of said rings has its inner edge chamfered, as at 77, and the other ring has its inner edge correspondingly dished, as at 78.

79 are numerous discuses so cut and stamped out of thin sheet iron as to give their obverse and reverse faces correspondingly dished and chamfered forms which fit or "nest" to one another and to the correspondingly dished and chamfered inclosing-rings 73 74 in the manner shown. Before, however, being thus nested together actual contact of the discuses with one another and with the inclosing-rings is prevented by the interposition of gaskets 80 of any suitable insulating and cementing material, such as thin Manila paper coated with liquid shellac. The composite core thus built up, being held in a vise until "set," forms a laminated but compact and coherent mass. Upon the thus constructed core the bobbins are wound before the screwing of the core to its place on the spiders. To the rear spiders is screwed a non-magnetic disk 65, which, having holes drilled in it, as at 66, may be utilized to rectify any lack of armature equilibrium. To the front spider is screwed or bolted a disk or circular slab 67, of any suitable non-conducting substance, such as vulcanite, ebonite, or vulcanized fiber. An annular depression 68 in the face of said disk 67 receives and has attached to it by screws 69 the heads of a series of L-formed commutator staves or sections 70, whose width is such as to enable the represented mutually detached or isolated distribution of such sections that allows free circulation of air on every side but that in contact with the disk and with the clips 71, which coact with the screws 69 in holding the sections in place, and also serve to bind the terminals 72 of the armature-bobbins firmly to their proper commutator-sections.

While disclaiming novelty in embossed imperforate discuses, cementing gaskets, and confining-rings, separately considered, I claim as new and of my invention—

1. In a governor for an electro-dynamic machine or motor, a driving-circuit having a normally-open loop of low resistance wound upon the field-magnet in contrary direction to the field's direct windings, one of said loop's terminals being attached to the vibrating member of a centrifugal regulator, (connected to the armature-shaft,) so as to be oscillated isochronously with varying speeds of the revolving armature between two opposing terminals of said loop, substantially as and for the purposes set forth.

2. In a governor for an electro-dynamic machine or motor, the described normally-open low-resistance loop wound differentially to and in shunt of the direct winding of the field-magnet, and one of whose rheophores has two terminals, between which is the single terminal of its other rheophore, said terminal being attached to the reciprocating member of a centrifugal regulator geared or belted to the armature, so as to automatically close said loop, and thereby neutralize the field magnetism at armature speeds, either above or below the prescribed range, substantially as set forth.

3. In a governor for an electro-dynamic machine or motor, the combination, with a field-magnet and armature wound in series with the driving-circuit, of a normally-open loop-circuit of low resistance wound upon the field-magnet in opposition to and in shunt of its direct winding, and having one of its rheophores attached to the reciprocating member of a centrifugal regulator, (driven from the armature-shaft,) so as to be automatically vibrated between the two terminals of its other rheophore, one of said terminals being adjustable relatively to the other, substantially as set forth.

4. In a governor for an electro-dynamic machine or motor, a low-resistance circuit which shunts and is wound in contrary directions to the direct winding of the field-magnet, and whose negative rheophore is attached to the reciprocating member of a centrifugal governor, so as to be automatically shifted by changing armature speeds between the two contact-pieces of its positive rheophore, one of said contact-pieces being adjustable and the other contact-piece yielding in direction of the path of vibration of said negative rheophore, substantially as and for the several purposes explained.

5. In a governor for an electro-dynamic machine or motor, the described combination of the low-resistance normally-open loop 7, so wound as when closed in the manner explained to short-circuit and oppose the direct windings of the field-magnet, one of the rheophores of said loop having a single terminal 20 attached to the vibrating member of a centrifugal regulator 27 isochronously oscillated with varying speeds of the armature-shaft, and provided with collapsing spring 29, the other rheophore of the said loop having two contact-pieces 9 10, located on opposite sides of and in the path of vibration of said single terminal, one of said contact-pieces being a brush 9, adjustable toward and from the other contact-piece, which piece is held normally toward said vibrating terminal by a spring 18, and has a retracting-handle 10′, as set forth.

6. In a dynamo or an electric motor, the combination of the insulated thimbles 50, the insulated rotatable brush-shanks 38, the rotatable hoop 58, and the rod-and-spring connections 54 56.

7. In the commutator-brush holder of an electric generator or motor, the combination of the following elements, to wit: the support or bearer 34 35, capable of circumferential adjustment about the axis of rotation of the commutator and containing the insulated rotatable shanks 38 of the brush-clamps, said shanks being capable of independent vibration about their respective axes, and of being locked to any angular adjustment relatively to the bearer by means of binding-screws 49, the sectors 48, and the thimbles 50, said thimbles being on one side connected by springs 54 to said support, and on the other side by rods 56 to a rotatable hoop 58 thereupon, substantially as and for the purposes explained.

8. In the armature-core of an electro-dynamic machine, the described combination of the following elements, to wit: a series of imperforate conformably-embossed iron discuses magnetically insulated and mechanically united by cementing gaskets and confined between a pair of rings having correspondingly raised and depressed faces, and being attached to the armature-shaft.

In testimony of which invention I hereunto set my hand.

GEORGE F. CARD.

Attest:
L. C. BLACK,
GEO. H. KNIGHT.